US012594783B2

(12) United States Patent
Klein

(10) Patent No.: US 12,594,783 B2
(45) Date of Patent: Apr. 7, 2026

(54) PAINT APPLICATOR CLEANING APPARATUS

(71) Applicant: Robert Klein, Pomona, NY (US)

(72) Inventor: Robert Klein, Pomona, NY (US)

(73) Assignee: HAPPY BRUSH LLC, Columbus, OH (US)

( * ) Notice: Subject to any disclaimer, the term of this patent is extended or adjusted under 35 U.S.C. 154(b) by 122 days.

(21) Appl. No.: 18/617,413

(22) Filed: Mar. 26, 2024

(65) Prior Publication Data

US 2025/0303784 A1 Oct. 2, 2025

(51) Int. Cl.
*B44D 3/00* (2006.01)
*A46B 17/06* (2006.01)
*B08B 3/02* (2006.01)

(52) U.S. Cl.
CPC .............. *B44D 3/006* (2013.01); *A46B 17/06* (2013.01); *B08B 3/02* (2013.01); *B08B 2203/0211* (2013.01)

(58) Field of Classification Search
CPC ........... B44D 3/006; A46B 17/06; B08B 3/02; B08B 2203/0211
See application file for complete search history.

(56) References Cited

U.S. PATENT DOCUMENTS 2,831,488 A * 4/1958 Anderson .............. B44D 3/006 68/213
3,075,534 A * 1/1963 Habostad ............... B44D 3/006 68/213
3,897,797 A * 8/1975 Wright ................... B44D 3/006 134/155
4,130,124 A 12/1978 Sherwin
4,377,175 A * 3/1983 Fritz ...................... B44D 3/006 68/213
4,380,478 A * 4/1983 Cooney .................. B44D 3/006 68/213
4,641,673 A * 2/1987 Conley .................. B44D 3/006 68/213
4,668,384 A * 5/1987 Holman ................. B01D 41/04 134/900
4,672,987 A * 6/1987 Brandt ................... B44D 3/006 134/143
4,708,152 A * 11/1987 Hibberd ................. B44D 3/006 134/900
4,809,722 A * 3/1989 Pennise .................. B44D 3/006 68/213
4,957,127 A * 9/1990 Kostopoulos .......... B44D 3/006 68/213
5,086,796 A * 2/1992 Bailey .................... B44D 3/006 134/182
5,163,459 A * 11/1992 Bailey .................... B44D 3/006 134/182

(Continued)

*Primary Examiner* — Benjamin L Osterhout
(74) *Attorney, Agent, or Firm* — Bradley J. Thorson; DeWitt LLP

(57) ABSTRACT

Cleaning of paint applicators such as brushes and rollers is made less messy and more efficient by cleaning them in a chamber of a housing to which a source of cleaning fluid flows, particularly with amount and pressure of such flow is controlled by at least one valve position immediately adjacent to and in fluid communication with the chamber of the housing, and from which cleaning fluid flows through one or more small discharge openings.

20 Claims, 3 Drawing Sheets

(56) References Cited

U.S. PATENT DOCUMENTS

| | | | | | |
|---|---|---|---|---|---|
| 5,406,967 | A * | 4/1995 | Eberle | A46B 17/06 | |
| | | | | 134/182 | |
| 5,839,459 | A * | 11/1998 | Bisby | B44D 3/006 | |
| | | | | 134/900 | |
| 5,935,342 | A | 8/1999 | Boyd | | |
| 6,079,429 | A * | 6/2000 | Zarich | B44D 3/006 | |
| | | | | 134/182 | |
| 7,401,614 | B2 * | 7/2008 | Ruzumna | B44D 3/006 | |
| | | | | 134/135 | |
| 7,640,941 | B2 * | 1/2010 | Watters | A46B 17/06 | |
| | | | | 68/213 | |
| 11,731,453 | B1 * | 8/2023 | Garland | A46B 17/06 | |
| | | | | 134/138 | |
| 2001/0047818 | A1 * | 12/2001 | Bastien | B44D 3/006 | |
| | | | | 134/900 | |
| 2008/0078429 | A1 | 4/2008 | Hoffman | | |
| 2010/0316433 | A1 * | 12/2010 | Castellana | B05C 17/0308 | |
| | | | | 401/268 | |
| 2018/0147883 | A1 * | 5/2018 | Burke | B44D 3/006 | |

* cited by examiner

PAINT APPLICATOR CLEANING APPARATUS

CROSS-REFERENCED TO RELATED APPLICATIONS

Not applicable.

STATEMENT REGARDING FEDERALLY SPONSORED RESEARCH OR DEVELOPMENT

Not applicable.

BACKGROUND OF THE INVENTION

I. Field of the Invention

The present invention relates generally to painting. More specifically, the present invention relates to apparatuses for cleaning paint applicators such as paint brushes and paint rollers.

II. Discussion of Related Art

Paint applicators such as paint brushes and paint rollers have been used for a very long time. One of the earliest examples of a paint brush comes from ancient China, around 3000 BCE. The invention of the paint roller has been attributed to Norman Breakey around 1940. Both these types are widely used and work remarkably well when used for the first time. The efficacy of these applicators is markedly diminished during subsequent use unless the applicator tool has been fully cleaned.

Cleaning paint applicators tends to be a very messy task. Cleaning typically involved the use of water applied under pressure from a hose or faucet. Paint released from a brush or roller tends to travel some distance, often landing on adjacent surfaces such as walls, flooring, tools, and clothing.

This, after all these years there still is a need for cleaning apparatuses that can apply water or other chemicals with sufficient force to release paint from a brush or roller, restrain the travel of the released paint, and permit the mixture of water and released paint to drain from the cleaning apparatuses to a container for appropriate disposal.

SUMMARY OF THE INVENTION

The foregoing problems are solved by a paint applicator cleaning apparatus comprising: a body defining an internal chamber and having a first end and a second end; a first end cap at the first end, said first cap comprising a plurality of drain holes; a second end cap configured to selective close the second end; and a nozzle assembly connected to the second end cap and configured to be selectively placed in fluid communication with the internal chamber. In some embodiments, the nozzle assembly comprising (i) a nozzle with at least one orifice, (ii) a ball valve comprising a valve member having a flow position and an occluded position, and a handle couple to the valve member and configured to move the valve member between the flow position and the occluded position, (iii) a connector comprising a flange, and (iv) an adapter held to the nozzle by the flange and configured to couple the valve assembly to a fluid supply. The nozzle may have a single orifice or a plurality of orifices. The orifices (or valve member) may be configured to produce a venturi effect when the valve member is in the flow position and water or other chemicals are flowing through the valve assembly.

In some embodiments, such as those configured for use when cleaning paint brushes, the paint applicator cleaning apparatus further comprising (i) at least one hinge connecting the second end cap to the body, said hinge configured to permit the second end cap to rotate between an open position and a closed position, (ii) a gasket residing between the body and the second end cap when the second end cap is in the closed position, and (iii) a catch attached to one of said body and said second end cap and a latch attached to the other of said body and said second end cap, wherein said latch and said catch are configured to temporarily secure the second end cap in the closed position. A connection gasket also may be placed within the adapter to ensure a leak-resistant connection between the nozzle assembly and any pipe or hose extending to a water source.

The body of the paint applicator cleaning apparatus may be formed from a transparent plastic material, for example a clear polycarbonate or a clear acrylic. This allows the user to observe the paint applicator as it is being cleaned.

In embodiments configured for use with a roller, the first end cap may include a roller holder configured to be received within an end of a standard paint roller and center the standard paint roller within the internal chamber. In embodiments configured for use with a paint brush, the body has a first portion adjacent the first end cap and a second broader portion adjacent the second end cap, wherein the first portion is configured to receive a handle of a paint brush and the second broader portion is adapted to receive a ferrule and bristles of the paint brush.

The type of connection between the first and second end caps and the first end and a second end of the body may vary. Such connections may be threaded connections or, as discussed above, a connection comprising one or more hinges and a lock such as a lock comprising a catch attached to one of the body and the end cap and a latch attached to the other of the body and the end cap. The latch and the catch are configured to temporarily secure the end cap in the closed position.

BRIEF DESCRIPTION OF THE DRAWINGS

The features and attributes which may be employed to practice the present invention will be better understood from a review of the detailed description provided below in conjunction with the accompanying drawings.

DETAILED DESCRIPTION

Figure 1:
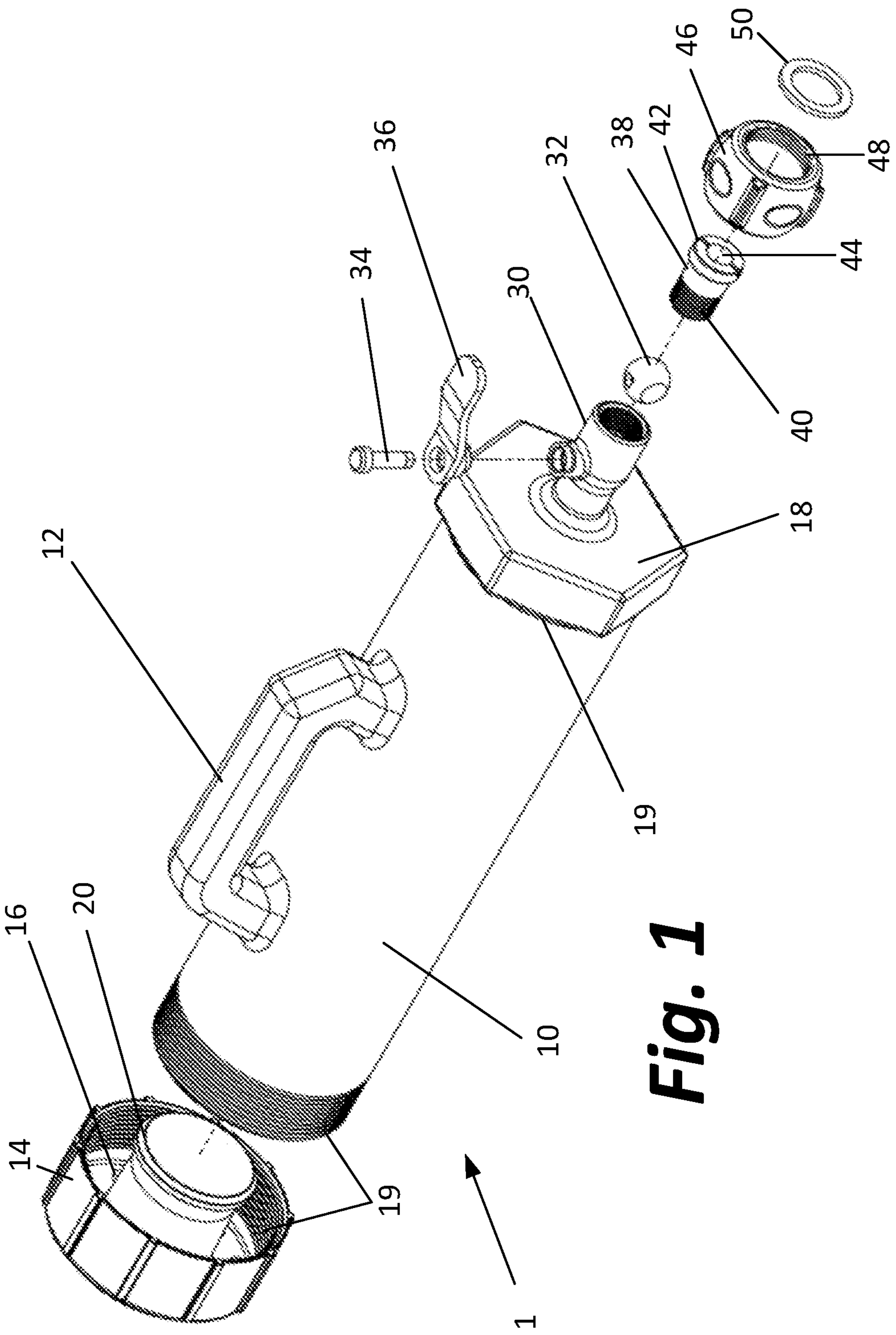
FIG. 1 is a perspective exploded view of a first exemplary embodiment of the present invention.

This description of the preferred embodiment is intended to be read in connection with the accompanying drawings, which are to be considered part of the entire written description of this invention. In the description, relative terms such as "lower", "upper", "horizontal", "vertical", "above", "below", "up", "down", "top" and "bottom", "under", as well as derivatives thereof (e.g., "horizontally", "downwardly", "upwardly", "underside", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "joined", and "joining" are used interchangeably and refer to one structure or surface being secured to another structure or surface or integrally fabricated in one piece unless expressly described otherwise.

Figure 2:
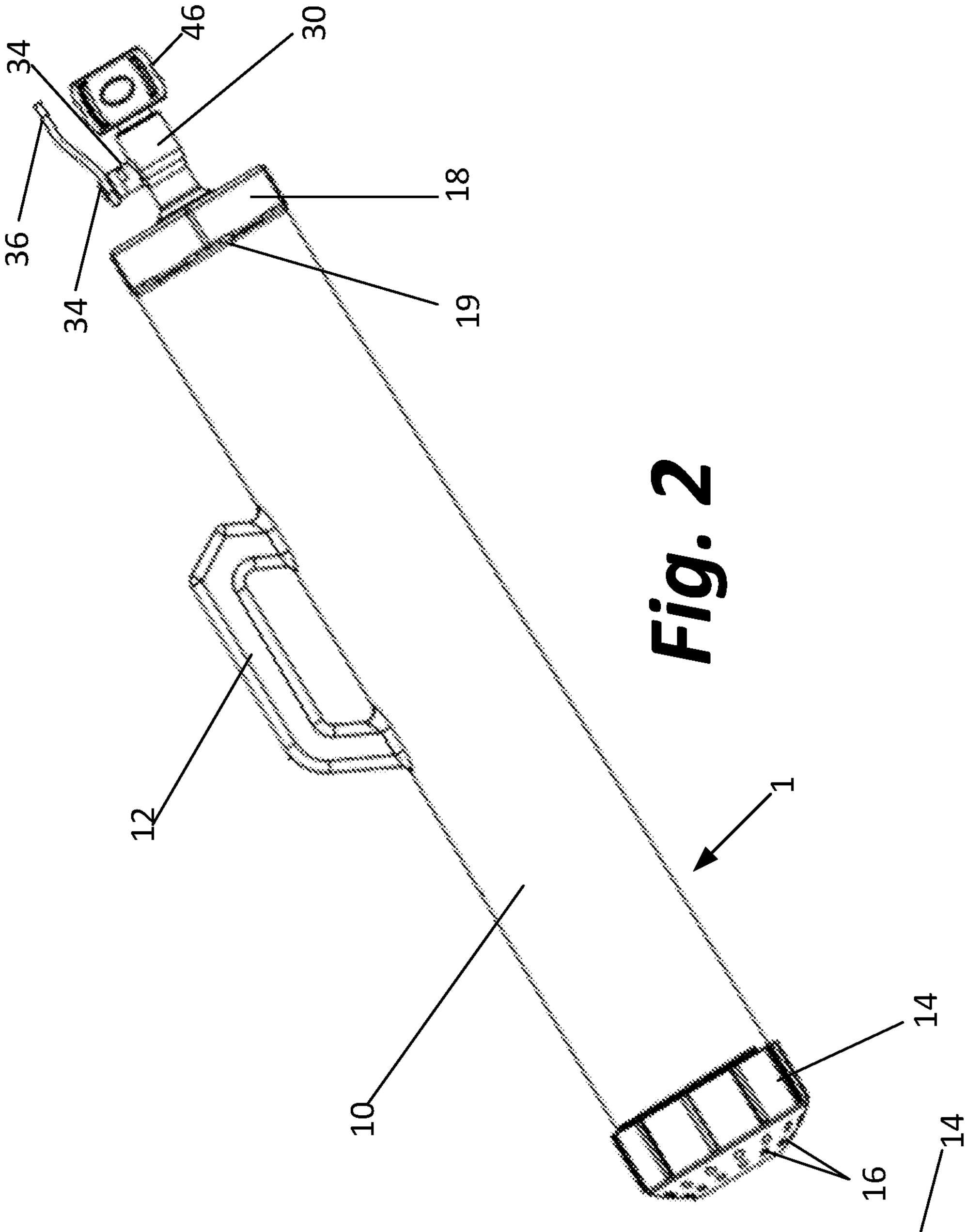
FIG. 2 is a perspective view of a second exemplary embodiment of the present invention.
Figure 3:
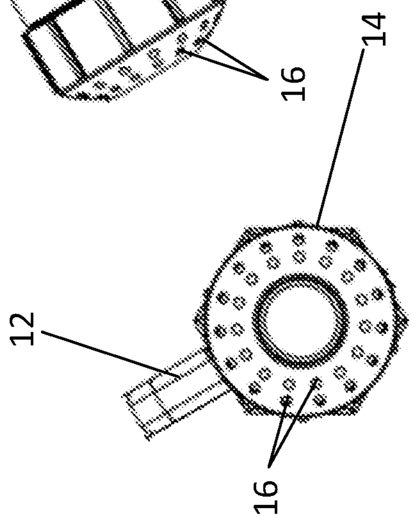
FIG. 3 is an end view of the exemplary embodiment of FIG. 2.

Two exemplary embodiments of the present invention, configured for use to clean a paint applicator such as a paint roller, are illustrated in FIGS. 1-3. Most features of these two embodiments are identical. Each has a cylindrical main body 10. The main body 10 shown in FIG. 2 is proportionally longer than the main body 10 shown in FIG. 1. This difference in size relates to the length of the paint roller to be cleaned. Within the main body 10 is a chamber that extends the full length of the main body between the two ends of the main body. Coupled to the exterior of the main body 10 is a handle 12.

Located at the first end of the main body 10 is a first end cap 14. End cap 14 may be permanently fixed to the main body 10 or may be removably attached to the main body 10 via cooperating first screw threads formed in the main body and second screw threads formed in the first end cap 14. Extending through the end cap 14 are a plurality of drain holes 16. The end cap 14 also includes a centered roller holder 20 extending back toward the main body 10. Roller holder 10 may be inserted into the central channel of a paint roller and thereby center the pain roller in the chamber formed by the walls of the main body 10.

Located at the second end of the main body 10 is a second end cap 18. End cap 18 may be permanently fixed to main body 10, assuming the first end cap 14 is not. In either case, the second end cap 18 may be removably attached to the main body 10 via cooperating pair of screw threads 19 comprising third threads formed in the main body 10 and fourth screw threads formed in the second end cap 18. Other methods may be employed to couple the end caps to the respective ends of the main body without deviating from this invention.

Coupled to the second end cap 18 is a nozzle assembly comprising nozzle 30. Nozzle 30 has an outer housing and a single orifice in some embodiments or a plurality of orifices in other embodiments. In either case, the orifice(s) are in fluid communication with the chamber of the main body 10. The nozzle assembly further comprises a valve. As shown, the valve is a ball valve including a valve ball 32, a handle 36 and a stem 34 coupling the valve ball 32 to the handle 36. The handle 36 can be turned to rotate the valve ball 32 between a flow position and an occluded position. The nozzle assembly also includes a connector 38 and an adapter 46. The connector has a threaded end 40, a flange 42 at the other end, and a flow channel 44 extending through the connector 38. The adapter 46 has internal threads and an opening surrounded by a wall. The size of the opening permits the threaded end 40 to be passed through the opening and the flange 42 engages the wall. The arrangement permits adapter 46 to be fixed to the valve, cleaning apparatus 1 to be attached to a hose or pipe coupled to a water (or other liquid) source, and provides a flow path from the water (or other liquid source) to the ball valve. When the valve ball 32 is in the flow position, a flow path is established between the water (or other liquid) source to the interior chamber of the main body 10 and ultimately out again through the drain holes 16 of the first end cap 14. This flow path is blocked by the valve ball 32 when the valve ball 32 is in the occluded position.

Figure 4:
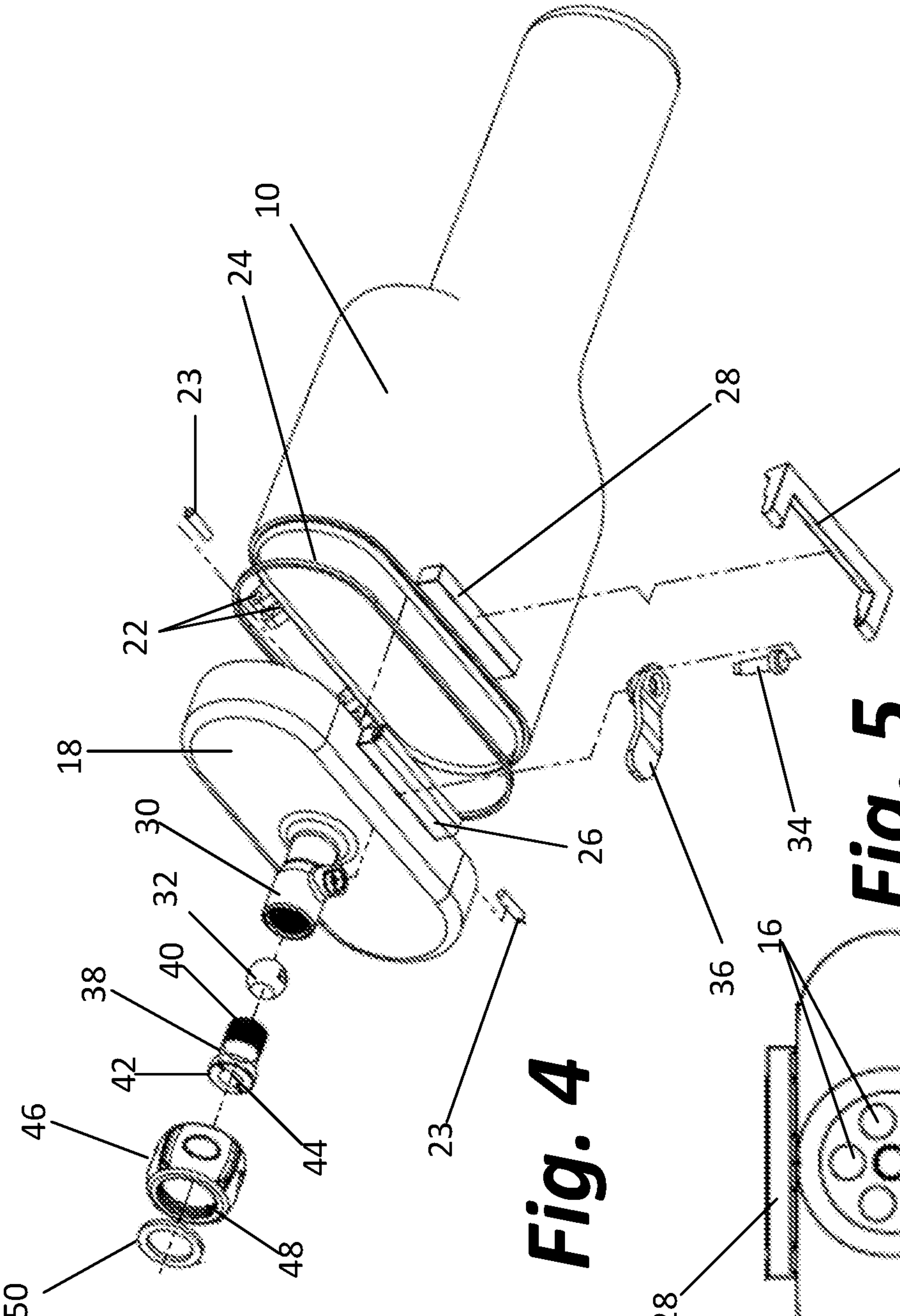
FIG. 4 is a perspective exploded view of a third exemplary embodiment of the present invention.
Figure 5:
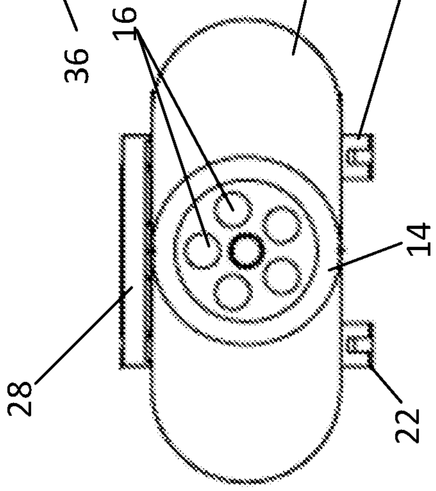
FIG. 5 is an end view of the exemplary embodiment of FIG. 4.

Another embodiment of the present invention, configured for use to clean a paint applicator such as a paint brush, is illustrated in FIGS. 4 and 5. In this embodiment, main body 10 has a first narrower portion (adjacent the first end cap 14) adapted to receive the handle of a paint brush and a second broader portion (adjacent the second end cap 18) adapted to receive the ferrule and bristles of the paint brush. Coupled to the exterior of the main body 10 is a handle 12.

Located at the first end of the main body 10 is a first end cap 14. End cap 14 may be permanently fixed to the main body 10 or may be removably attached to the main body 10 via cooperating first screw threads formed in the main body and second screw threads formed in the first end cap 14. Extending through the end cap 14 are a plurality of drain holes 16.

Located at the second end of the main body 10 is a second end cap 18. End cap 18 is attached to main body 10 by a pair of hinges 22 by hinge pins 23. This arrangement of the hinges 22 and hinge pins 23 allows the end cap 18 to be rotated between an open position and a closed position. The open position allows for insertion of a paint brush to be cleaned into the chamber defined by the main body 10 and allows for removal of a cleaned paint brush from the chamber. In its closed position, the end cap 18 cooperates with a gasket 24 and a lock comprising latch 26 and catch 28 to create a water-resistant seal between the main body 10 and the second end cap 18. Other methods may be employed to couple the end caps to the respective ends of the main body without deviating from this invention.

Coupled to the second end cap 18 of the embodiment shown in FIGS. 3 and 4 is a nozzle assembly comprising nozzle 30. Nozzle 30 has an outer housing and a single orifice in some embodiments or a plurality of orifices in other embodiments. In either case, the orifice(s) are in fluid communication with the chamber of the main body 10. The nozzle assembly further comprises a valve. As shown, the valve is a ball valve including a valve ball 32, a handle 36 and a stem coupling the valve ball 32 to the handle 36. The handle 36 can be turned to rotate the valve ball 32 between a flow position and an occluded position. The nozzle assembly also includes a connector 38 and an adapter 46. Connector 38 has a threaded end 40 and a flange 42 at the other end, and a flow channel 44 extending through the connector 38. Adapter 46 having internal threads and an opening surrounded by a wall adapted to engage the flange 42 is connected to the nozzle 30 by the connector 38. The size of the opening permits the threaded end 40 to be passed through the opening and the flange 42 engages the wall. The arrangement permits adapter 46 to be fixed to the valve, cleaning apparatus 1 to be attached to a hose or pipe coupled to a water (or other liquid) source, and provides a flow path from the water (or other liquid source) to the ball valve. When the valve ball 32 is in the flow position, a flow path is established between the water (or other liquid) source to the interior chamber of the main body 10 and ultimately out again through the drain holes 16 of the first end cap 14. This flow path is blocked by the valve ball 32 when the valve ball 32 is in the occluded position.

When any of the embodiments described above are in use, a paint applicator is placed in the chamber defined by the main body 10 and the two end caps 14 and 18 are in the closed position. A gasket 50 is placed in the adapter 46 and a water source of other liquid source is attached using threads 48 of the adapter 46 to the nozzle assembly. Turing flow on at the source allows water (or other fluid) to flow from the source to the paint applicator cleaning apparatus. The valve assembly of the paint applicator cleaning apparatus is used to regulate the flow of that liquid into the chamber of the main body 10 and onto the pain applicator for cleaning. The valve produces a venturi effect when in certain positions intermediate of the fully open and fully closed position. This, the user may modulate the position of the valve not only to modulate the amount of flow into the chamber, but also the pressure of that flow.

The fluid thus cleans paint from the applicator and, rather than being discharged randomly during cleaning, flows in a controlled fashion through the openings 16 in end cap 14. When the housing is made of transparent glass or a transparent plastic material such as a polycarbonate or an acrylic, the user can constantly observe the paint applicator and detect when it is clean.

As noted above, the nozzle 30 may have a single orifice or may have a plurality of orifices such that it acts as a manifold. The nozzle may also have arms extending across the second end cap 18 and internally down the sides of the main body with the orifices arranged along these arms. The nozzle assembly may also have additional valves individually controlling flow and pressure through subsets of the plurality of orifices.

The foregoing description is intended to explain the various features and advantages but is not intended to be limiting. The scope of the invention is defined by the following claims which are also intended to cover a reasonable range of equivalents.

What is claimed is:

1. A paint applicator cleaning apparatus comprising:

(a) a body defining an internal chamber and having a first end and a second end;

(b) a first end cap at the first end, said first end cap comprising a plurality of drain holes;

(c) a second end cap configured to selectively close the second end; and (d) a nozzle assembly connected to the second end cap and in fluid communication with the internal chamber, said nozzle assembly comprising a nozzle with at least one orifice, a valve comprising a valve member having a flow position and an occluded position and a handle coupled to the valve member and configured to move the valve member between the flow position and the occluded position, and an adapter configured to couple the nozzle assembly to a fluid supply.

2. The paint applicator cleaning apparatus of claim 1 further comprising at least one hinge connecting the second end cap to the body, said hinge configured to permit the second end cap to rotate between an open position and a closed position.

3. The paint applicator cleaning apparatus of claim 2 further comprising a catch attached to one of said body and said second end cap and a latch attached to the other of said body and said second end cap, and wherein said latch and said catch are configured to temporarily secure the second end cap in the closed position.

4. The paint applicator cleaning apparatus of claim 2 further comprising a gasket residing between the body and the second end cap when the second end cap is in the closed position.

5. The paint applicator cleaning apparatus of claim 1 comprising a connection gasket residing within the adapter.

6. The paint applicator cleaning apparatus of claim 1 wherein the body has a first portion adjacent the first end cap and a second broader portion adjacent the second end cap, wherein the first portion is configured to receive a handle of a paint brush and the second broader portion is adapted to receive a ferrule and bristles of the paint brush.

7. The paint applicator cleaning apparatus of claim 1 wherein said body is formed from a transparent plastic material.

8. The paint applicator cleaning apparatus of claim 7 wherein the transparent plastic material is selected from a group consisting of a polycarbonate and an acrylic.

9. The paint applicator cleaning apparatus of claim 1 wherein the first end of the body has a first set of threads, wherein the first endcap has a second set of threads, and wherein the first set of threads and the second set of threads are configured to mesh with each other to temporarily secure the first end cap to the first end of the body.

10. The paint applicator cleaning apparatus of claim 1 wherein the valve is a ball valve.

11. The paint applicator cleaning apparatus of claim 1 wherein the first end cap includes a roller holder configured to be received within an end of a standard paint roller and center the standard paint roller within the internal chamber.

12. The paint application cleaning apparatus of claim 1 wherein said nozzle comprises a plurality of orifices.

13. The paint application cleaning apparatus of claim 1 wherein said nozzle is configured to produce a venturi effect.

14. The paint application cleaning apparatus of claim 1 wherein said nozzle comprises a plurality of orifices.

15. The paint applicator cleaning apparatus of claim 1 wherein the body has a first portion adjacent the first end cap and a second broader portion adjacent the second end cap, wherein the first portion is configured to receive a handle of a paint brush, and the second broader portion is adapted to receive a ferrule and bristles of the paint brush.

16. A paint applicator cleaning apparatus comprising:

(a) a body defining an internal chamber and having a first end and a second end;

(b) a first end cap at the first end, said first end cap comprising a plurality of drain holes;

(c) a second end cap configured to selectively close the second end; and (d) a nozzle assembly connected to the second end cap and in fluid communication with the internal chamber, said nozzle assembly comprising a nozzle with at least one orifice, a ball valve comprising a valve member having a flow position and an occluded position, and a handle coupled to the valve member and configured to move the valve member between the flow position and the occluded position, a connector comprising a flange, and an adapter held to the nozzle by the flange and configured to couple the nozzle assembly to a fluid supply.

17. The paint applicator cleaning apparatus of claim 16 further comprising (i) at least one hinge connecting the second end cap to the body, said hinge configured to permit the second end cap to rotate between an open position and a closed position, (ii) a gasket residing between the body and the second end cap when the second end cap is in the closed position, and (iii) a catch attached to one of said body and said second end cap and a latch attached to the other of said body and said second end cap, wherein said latch and said catch are configured to temporarily secure the second end cap in the closed position.

18. The paint applicator cleaning apparatus of claim 16 comprising a connection gasket residing within the adapter.

19. The paint applicator cleaning apparatus of claim 16 wherein said body is formed from a transparent plastic material.

20. The paint applicator cleaning apparatus of claim 16 wherein the first end cap includes a roller holder configured to be received within an end of a standard paint roller and center the standard paint roller within the internal chamber.

* * * * *